United States Patent
DiGregorio et al.

(10) Patent No.: US 9,268,197 B1
(45) Date of Patent: Feb. 23, 2016

(54) EXTERNAL SHUTTER AND FLASH FOR ROLLING SHUTTER CAMERA

(71) Applicant: Canfield Scientific, Incorporated, Fairfield, NJ (US)

(72) Inventors: Daniel Eric DiGregorio, Fairfield, NJ (US); George Anthony Jaray, Chester, NY (US); James Vincent Crismale, Oradell, NJ (US)

(73) Assignee: Canfield Scientific, Incorporated, Fairfield, NJ (US)

( * ) Notice: Subject to any disclaimer, the term of this patent is extended or adjusted under 35 U.S.C. 154(b) by 0 days.

(21) Appl. No.: 14/601,398

(22) Filed: Jan. 21, 2015

(51) Int. Cl.
*G03B 9/70* (2006.01)
*G03B 15/05* (2006.01)
*G03B 9/28* (2006.01)

(52) U.S. Cl.
CPC .. *G03B 9/70* (2013.01); *G03B 9/28* (2013.01); *G03B 15/05* (2013.01)

(58) Field of Classification Search
CPC ............ G03B 9/28; G03B 9/70; G03B 15/05; H04N 5/2256; H04N 5/2354; H04M 1/0264
See application file for complete search history.

(56) References Cited

U.S. PATENT DOCUMENTS

| | | | | |
|---|---|---|---|---|
| 7,453,514 B2 * | 11/2008 | Furlan | .................. | H04N 5/2254 348/362 |
| 7,697,062 B2 * | 4/2010 | Wernersson | ......... | H04N 5/2354 348/224.1 |
| 8,670,068 B2 * | 3/2014 | Hsiung | ................ | G03B 11/043 348/371 |
| 9,110,355 B1 * | 8/2015 | Nourbakhsh | .......... | G03B 15/05 |
| 2014/0341555 A1 * | 11/2014 | Grasser | .................... | G03B 9/70 396/180 |

* cited by examiner

*Primary Examiner* — W B Perkey
(74) *Attorney, Agent, or Firm* — Brosemer, Kolefas & Assoc. LLC

(57) ABSTRACT

Methods and apparatus for providing an external flash and a global shutter for a device with an integrated rolling shutter camera entail synchronization of the external flash and shutter with the rolling shutter. Responsive to an indication from the device associated with the capture of one or more images, the external flash and shutter are controlled so that exposure is completed before the rolling shutter readout of the camera sensor begins. The disclosed methods and apparatus allow for high quality flash photography not previously possible with such cameras, commonly found in mobile devices, or the like.

21 Claims, 4 Drawing Sheets

EXTERNAL SHUTTER AND FLASH FOR ROLLING SHUTTER CAMERA

FIELD OF THE INVENTION

The present invention relates to digital image capture, particularly with the use of a camera having a rolling shutter.

BACKGROUND INFORMATION

As technology evolves and mobile devices such as smartphones and tablets become increasingly commonplace in a wide variety of environments including retail as well as medical settings, among others, there is a growing demand for mobile devices that can capture high quality images using only the camera available on such devices. In doing so, computing device, camera, imaging system, consultation screen and communications device, can all be merged into one portable device.

The ability to capture high quality images is particularly important for applications in which the images are to be further processed and analyzed, such as by image processing systems for identifying, characterizing, or measuring various conditions present in the images. One such application, for example, is in providing skin care consultation or treatment. This often entails the identification and characterization of certain skin conditions, some of which may not even be visible with the naked eye. If unable to minimize the effects of ambient lighting on the subject, the various algorithms and image processing techniques involved in such applications will provide substandard or erroneous results. Additionally for many such applications, standardization from image to image is important, particularly where images are to be compared, such as sequential images of subjects before and after treatment.

To achieve acceptable results, high-end DSLR cameras and well-controlled illumination environments have been typically used. For example, the VISIA system from Canfield Scientific employs a DSLR camera and multiple flash illumination sources within a booth-like enclosure to capture and analyze high quality facial images.

While the cameras built into tablets or other mobile devices are by no means equivalent in quality to high-end DSLR cameras, they have certainly made significant advances since their initial integration into such devices. One of their biggest drawbacks, however, is the lack of a high quality flash illumination source.

Flash photography has been around for over a century and relies on the principle that by creating an intense burst of light in a fraction of a second, the effects of ambient lighting can be negated or at least temporarily reduced as a photographic image is captured. Xenon flashes have been commonly used as illumination sources in flash photography.

While some mobile devices have LED "flashes" integrated therein, these are not nearly as bright as a typical xenon flash and do not operate in a similar manner. Rather than being pulsed for a fraction of a second to emit an intense burst of light, the LED flash of a mobile device is typically turned on as an image capture sequence begins and remains on for the entire process. The LED "flash" of a typical mobile device simply cannot match the performance of a xenon flash to minimize the effects of ambient lighting.

An additional complication arises from the use of a rolling shutter, typical of cameras used in mobile devices. With a rolling shutter, a still picture (in a still camera) or each frame of a video (in a video camera) is captured, not by taking a snapshot of the entire scene at a single instant in time, but rather by rapidly scanning across the scene, either vertically or horizontally. In contrast to a "global shutter," in which the entire frame is captured at the same instant, with a rolling shutter not all parts of the image of the scene are recorded at exactly the same instant. As such, the scene can change as it is recorded piecemeal. During playback of a captured image, however, the entire image of the scene is displayed at once, as if representing a single instant in time. As a result, images captured by rolling shutter cameras will display predictable distortions of fast-moving objects or rapid flashes of light.

Additionally, if illuminated using a flash that is not properly synchronized with the rolling shutter, a captured still image may appear to have two distinctly delineated portions of markedly different brightness. This problem does not occur with the LED "flash" of a typical mobile device camera because the LED is typically turned on as an image capture sequence begins and remains on for the entire process. As mentioned, however, such LED light sources simply cannot match the brightness of a xenon flash which is activated for a much shorter period of time.

One possible approach to address this problem would be to use an external xenon flash. For proper operation, however, precise synchronization of the external flash with the operation of the camera integrated into the mobile device is essential. Access to the circuitry that controls the image capture functions of a typical mobile device, however, is severely limited or non-existent, thereby making it difficult to interface an external flash to a mobile device.

The lack of a high quality flash illumination source is clearly a limiting factor in any attempt to use a mobile device camera to provide the level of image quality and standardization that is required for many applications, such as those mentioned above.

SUMMARY OF THE DISCLOSURE

Embodiments of methods and apparatus in accordance with the present disclosure overcome the aforementioned shortcomings by providing a global shutter and flash illumination source external to a mobile device having an integrated camera, yet which are properly synchronized with the operation of the integrated camera to allow high quality flash photography not otherwise possible.

A method of exposing an image to be captured with a device having a camera integrated therewith, comprises: initiating an image capture procedure, the image capture procedure having an exposure phase and a readout phase after the exposure phase; receiving an indication from the device; activating a light emitter after receiving the indication and before the end of the exposure phase; de-activating the light emitter; and closing a global shutter before the readout phase.

Apparatus for use with a device having a camera integrated therewith comprises: a global shutter for selectively shuttering the view of the camera; a light emitter for illuminating the view of the camera; and a controller, wherein the controller controls the global shutter and the light emitter in accordance with an indication from the device.

The above and other aspects and features of the present disclosure will be apparent from the drawings and detailed description which follow.

DETAILED DESCRIPTION

Figure 1:
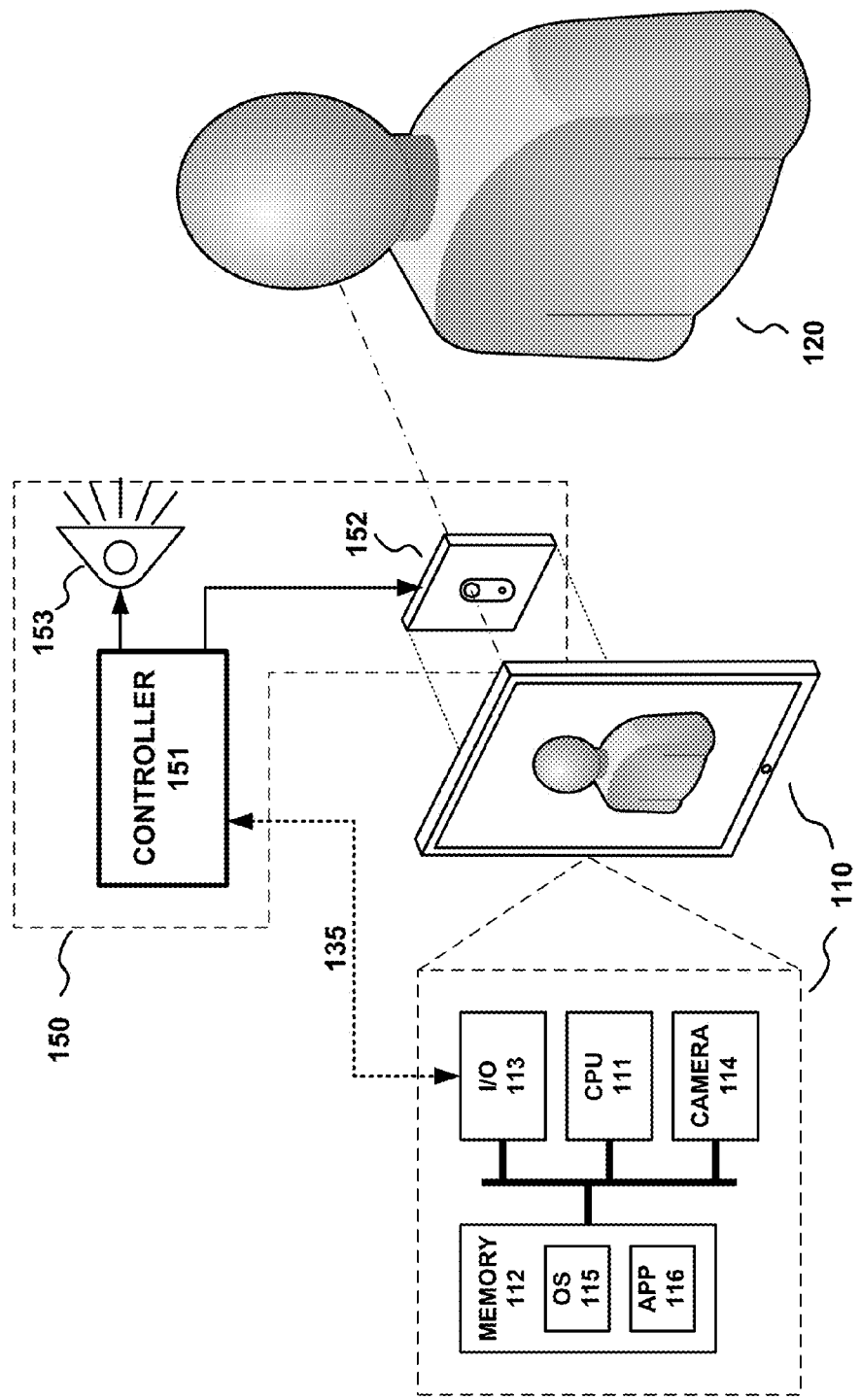
FIG. 1 is a schematic representation of an exemplary arrangement in accordance with the present disclosure for providing an external shutter and flash for a mobile device having a camera integrated therewith.

In the exemplary arrangement schematically depicted in FIG. 1, a mobile device 110, such as a tablet computer, smartphone, or the like, having a camera integrated therein, in this case facing out from the backside of the device, and a touchscreen display on the frontside, is used to capture a still image of a subject 120. An apparatus 150 implemented in accordance with the present disclosure provides flash and global shutter functionality for mobile device 110. As shown, apparatus 150 includes a controller block 151, which controls a global shutter 152 and a flash illumination source 153, or simply flash.

As shown in the block diagram depiction of mobile device 110, it is contemplated that mobile device 110 includes elements typical of such devices, such as a central processing unit (CPU) 111, memory 112 (e.g., RAM, ROM, EEPROM, flash, diskdrive, SD card, etc.), input/output (I/O) 113 (e.g., touchscreen display, communications, etc.), and a camera 114. As is typical of computing devices, CPU 111 executes software contained in memory 112 so as to cause mobile device 110 to operate, as manifested via I/O 113 and camera 114, in accordance with the software. While CPU 111 will typically execute a wide array of software to perform various functions, the software of interest for purposes of the present description includes operating system (OS) 115 and an image capture program or application 116, described in greater detail below.

In exemplary embodiments, controller block 151 includes a microprocessor having on-chip memory and various I/O ports. Controller block 151 also includes a communications interface for communicating with other devices such as mobile device 110 over a link 135, as described below.

In exemplary embodiments, shutter 152 is implemented with a rotary arrangement in which an arm attached to the axis of a motor or actuator is rotated across an optical opening to selectively open or block the optical opening. A variety of other implementations are also possible so long as the shutter 152 can meet the requirements of the given application in light of the principles of the present disclosure. In an exemplary embodiment, shutter 152 is implemented using liquid crystal display (LCD) technology. Because LCD devices typically polarize light passing through them, such an embodiment can be used in applications for which polarization is acceptable. By using a LCD shutter with the appropriate polarization, an additional polarizer can be eliminated for those which polarization is desired.

Figure 2B:
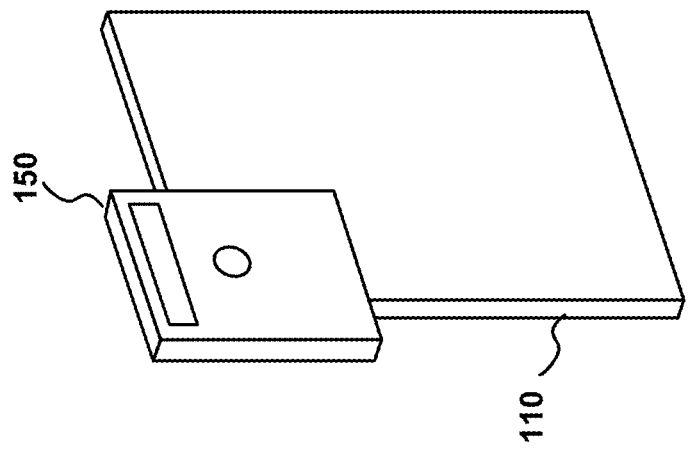
FIGS. 2A and 2B show several views of an exemplary embodiment of an apparatus implemented in accordance with the present disclosure.
Figure 2A:
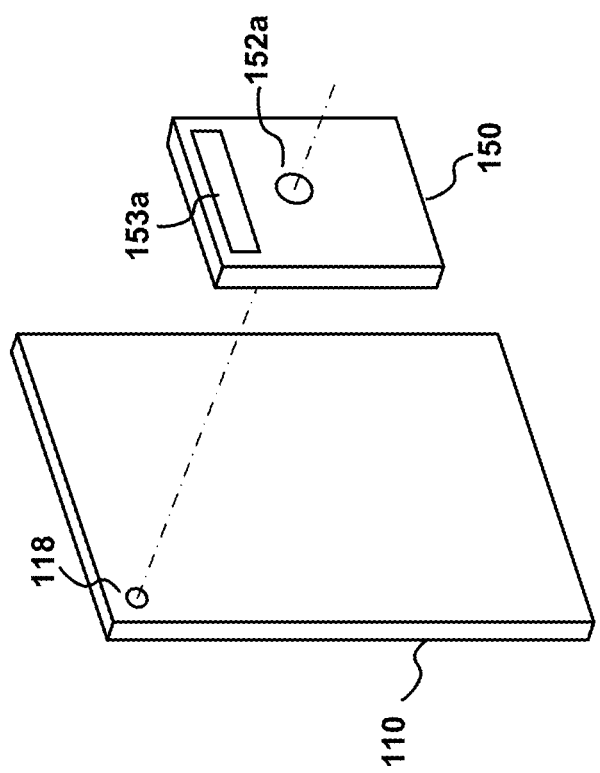

Shutter 152 is arranged with its opening along the optical path of the camera of mobile device 110 so as to selectively shutter the view sensed by the camera. As can be appreciated, while FIG. 1 schematically shows shutter 152 separated from mobile device 110, for proper operation shutter 152 will be arranged in close proximity to mobile device 110 so as to preferably completely cover the camera opening on the backside of the mobile device. FIGS. 2A and 2B described below, show an exemplary implementation depicting this relationship more clearly.

In exemplary embodiments, flash 153 is implemented with one or more xenon flash bulbs, although other illumination sources can be used, such as LEDs, depending on the desired characteristics. Considerations in the selection of flash 153 may include, for example, illumination intensity, response time, power consumption, and size, among others. Moreover, flash 153 may include two or more separate light sources within the same housing or in separate housings. In an exemplary embodiment, apparatus 150 includes one or more connectors for connecting one or more light sources to be controlled by controller 151.

Mobile device 110 and apparatus 150 intercommunicate via link 135, which may be wired or wireless, analog and/or digital, standardized or proprietary, unidirectional or bidirectional, and including but not limited to Universal Serial Bus (USB), radio frequency (RF) communications (e.g., near field communications (NFC), Wifi, Bluetooth), inductive, infrared, or acoustic, among others. In operation, link 135 is used to convey indications to apparatus 150 relating to image capture operations using camera 114 of mobile device 110. Responsive to such indications, controller 151 controls shutter 152 and flash 153, as described below in greater detail with reference to FIGS. 3 and 4. Link 135 can also be used to pass a variety of information between mobile device 110 and apparatus 150, including but not limited to status and/or configuration information.

Apparatus 150 may be powered from mobile device 110, from one or more batteries, an AC mains source, or any suitable power source. In exemplary embodiments, apparatus 150 can provide power to mobile device 110.

FIG. 2A is an isometric view of the backside of mobile device 110 and an exemplary embodiment of apparatus 150. FIG. 2A shows mobile device 110 and apparatus 150 separated, whereas FIG. 2B shows them in a mated state. As shown in FIG. 2A, the backside of mobile device 110 has an optical opening 118 for camera 114 integrated therein. Apparatus 150 has an optical opening 152a that extends through the body of apparatus 150 and is selectively shuttered by shutter 152. Optical opening 152a is axially aligned with optical opening 118 when mobile device 110 and apparatus 150 are properly mated. Optical opening 152a may or may not include one or more optical elements such as a cover glass, lens, filter, or polarizer (linear and/or circular) at one or more points along its extent.

In addition, apparatus 150 has a transparent, semi-transparent or translucent opening or window 153a through which light from flash 153 is emitted from apparatus 150 when the flash is activated. Window 153a may also include one or more filters, polarizers (linear and/or circular), or other suitable optical element to impart to the emitted light any desired characteristics. In exemplary embodiments, one or more polarizers are provided for each of the optical opening 152a of the shutter and window 153a of the flash. The polarizers can be oriented, fixedly or adjustably, so that their polarization axes are mutually perpendicular, parallel or at some intermediate angular relationship.

In the mated state, all light entering optical opening 118 and thus captured by camera 114 of mobile device 110, passes through shutter 152. Whenever the camera is enabled to provide a live view on the frontside display of device 110, shutter 152 is preferably in an open state so as not to obstruct the view that is captured by the camera and conveyed to the display. This can be the default state of the shutter 152 or the shutter 152 can be placed in the open state in accordance with an indication (e.g., an "open shutter" command) provided from mobile device 110 via link 135.

Any of a variety of suitable arrangements can be used to mate mobile device 110 and apparatus 150, including, for example, a clip, sleeve, clamp, clasp, or hook and loop arrangement, among other possibilities.

The operation of the exemplary arrangement of FIG. 1 will now be described with reference to the timing diagram shown in FIG. 3.

Figure 3:
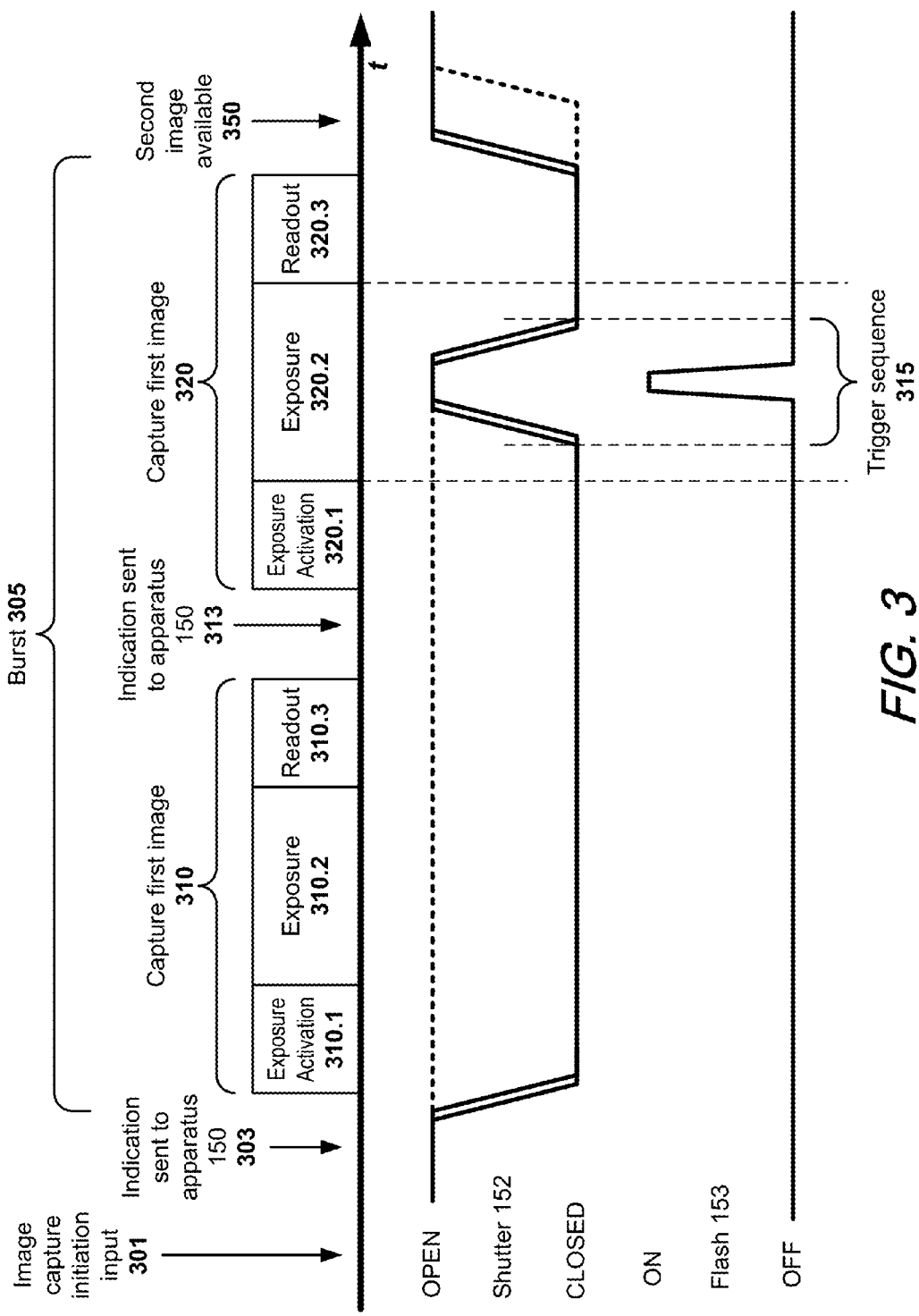
FIG. 3 is a timing diagram schematically showing an exemplary sequence of events occurring in the operation of the arrangement of FIG. 1.

As shown in FIG. 3, shutter 152 starts in an open state and flash 153 is off. It is possible for shutter 152 to start in the closed state, but as discussed above, preferably it would be open to allow live viewing of the scene as captured by the mobile device's camera.

It is contemplated that during an image capture operation in accordance with the present disclosure, the mobile device 110 will operate in accordance with a program or application 116 running on the device. Preferably, before image capture commences, application 116 enables a live view of the scene captured by integrated camera 114 onto the frontside touchscreen of device 110.

At some point 301, an image capture procedure is initiated such as by a user of device 110 pressing an image capture button. Such a button can be a "soft" button or widget presented by application 116 on the touchscreen of device 110, or it may be a hardware button. In exemplary embodiments, an image capture procedure can also be initiated automatically, without a user pressing an image capture button. In further exemplary embodiments, an image capture procedure can be initiated by device 150, as described below.

In exemplary embodiments, mobile device 110 is configured so that the press of the image capture button initiates a burst capture procedure in which multiple images are captured in rapid succession. In the operation depicted in FIG. 3, camera 114 of mobile device 110 is configured for a burst mode of operation to capture two images in rapid succession, as represented by 310 and 320 in burst 305. Preferably, camera 114 is configured for a longer than normal exposure time, such as 1/10 second or longer. Additionally, mobile device 110 is also preferably configured to disable the activation of any "flash" light source it may have, as it would not be needed, would consume power unnecessarily, or may interfere with the operation of apparatus 150.

As shown in FIG. 3, the capture of each image 310, 320 of burst 305 comprises three successive phases. In the first phase, exposure activation 310.1 (320.1), all photosites of the camera imaging sensor are activated simultaneously to begin the process of being exposed to the scene being projected onto the surface of the sensor. This is followed by the exposure phase 310.2 (320.2) during which all photosites of the imaging sensor simultaneously become fully exposed to the scene. In the last phase, readout 310.3 (320.3), the photosites of the imaging sensor are read out and reset row-by-row or column-by-column. This sequential operation during the readout phase is what gives a rolling shutter its characteristic rolling operation.

It should be noted that the duration of the exposure phase 310.2 (320.2) will vary with the selected exposure time and that the durations of one or more of the phases may vary based on camera characteristics. Moreover, in a burst mode of operation, such as in FIG. 3, the three phases may vary between successive images. For example, the exposure activation phase for images following the first image 310 within the same burst may be shortened or omitted.

Shortly after the image capture procedure is initiated at 301, such as by the user pressing the image capture button on device 110, application 116 generates a call, or the like, to operating system 115 of the mobile device 110 to operate camera 114 in accordance with the configuration described above. In response, it is contemplated that operating system 115 will provide a callback, or the like, to application 116 indicating to the application that the camera is ready to carry out the requested operation. Responsive to receiving the callback from operating system 115 that camera 114 is ready, application 116 causes an indication (e.g., a "start of image capture" message or a "close shutter" command) to be sent via link 135 to apparatus 150, as represented by event 303. Responsive to said indication, apparatus 150 closes shutter 152, assuming it was open to begin with. Additionally, application 116 instructs operating system 115 to cause the camera to start the two-image burst capture procedure 305. It should be noted that the order in which application 116 causes the aforementioned indication to be sent to apparatus 150 and instructs operating system 115 to start the image capture procedure may be reversed.

As the burst image capture proceeds, operating system 115 may provide additional callbacks to application 116. In an exemplary embodiment, operating system 115 generates a callback for each image 310, 320 in burst 305 as the capture of the respective image is completed. Each such callback provides an indication to application 116 that an image has been captured and is available for retrieval, such as from an image buffer, or the like. The callback may include a reference or pointer to the image buffer, an object containing zero or more compressed (or uncompressed) samples of a particular media type or other suitable information. As can be appreciated, the specific features of such callbacks will depend on the mobile device operating system 115. It is contemplated that application 116 will discard or ignore the first image 310 and keep the second image 320.

Responsive to the reception of the callback for first image 310, application 116 causes an indication (e.g., a "start trigger procedure" command) to be sent via link 135 to apparatus 150, as represented by event 313. Responsive to said indication, controller 151 of apparatus 150 starts a precisely timed procedure during which shutter 152 is opened and closed and flash 153 activated. More specifically, at a precisely timed interval after the reception of the indication from device 110, controller 151 causes shutter 152 to open during exposure phase 320.2 of the second image. Shutter 152 stays open for at least a portion of exposure phase 320.2, but in any case, closes before the readout of photosites in phase 320.3 begins. Closing shutter 152 before the readout of the photosites ensures that there will be no further changes in the exposure of any of the photosites before they are read out, thereby avoiding any of the above-discussed undesirable effects of the rolling shutter.

As shown in FIG. 3, while shutter 152 is open, flash 153 is activated at some point during exposure phase 320.2 and kept on for at least a portion of exposure phase 320.2. Because the activation of flash 153 is typically much faster than the opening of shutter 152, flash 153 is activated a period of time after commencement of the opening of shutter 152 so as to ensure that shutter 152 is fully open when flash 153 is activated. Preferably, the activation of flash 153 is also controlled so that it will turn off before shutter 152 is closed. Because the speed with which shutter 152 responds to control signals from controller 151 may vary and flash 153 can be controlled with greater timing precision, deactivating flash 153 before shutter 152 is closed provides better exposure control.

As described, the sequence of: 1) opening shutter 152, 2) turning on flash 153, 3) turning off flash 153, and 4) closing shutter 152, is a precisely timed sequence of events, represented in FIG. 3 as trigger sequence 315. While the timing relationship of these events within sequence 315 is tightly controlled by controller 151, it is contemplated, however, that the timing of sequence 315 relative to exposure phase 320.2 can vary. Such variation can be attributed to a variety of factors beyond the control of application 116 or apparatus 150, including, for example, the timing of the sending of indications from mobile device 110 to apparatus 150 over link 135, the timing of callbacks from operating system 115, and the interval between successive images (310, 320) in burst 305, among others. Accordingly, apparatus 150 is preferably implemented so that the duration of sequence 315 is sufficiently short relative to that of exposure phase 320.2 so that given the maximum possible variation, sequence 315 will occur during exposure phase 320.2 under all conditions. In an exemplary embodiment, for example, shutter 152 is open for a much faster exposure time (e.g., $\frac{1}{60}$s or faster) than the exposure time of the camera (e.g., $\frac{1}{10}$s or slower). By thus implementing an exposure time several multiples (e.g., six) of the shutter time, the exemplary embodiment can tolerate sizable variations in the times at which shutter 152 actually opens and closes, while ensuring that the shutter will consistently open and close within the much longer exposure time window.

Once the readout phase 320.3 of the second image 320 has completed, shutter 152 can be opened again to allow live viewing of the scene captured by camera 114. Additionally, at 350, the image as read out during readout phase 320.3 is available for access, as indicated by a callback from operating system 115 to application 116. Application 116 can then cause the captured image to be displayed, stored, processed, and/or communicated via one or more of the interfaces with which the mobile device 110 may be equipped.

It should be noted that the re-opening of shutter 152 after the capture of image 320 can occur after event 350, as indicated by the dotted transition in FIG. 3. Moreover, the re-opening of shutter 152 can be timed, as in the above-described trigger sequence, or it can be done in response to a further indication (e.g., a "open shutter" command, or an "image capture finished" message) from mobile device 110 generated responsive to the aforementioned operating system callback indicating the completion of the capture of image 320.

In the above-described embodiments, the image capture process is initiated at 301 from mobile device 110, such as by a user pressing an image capture button on the mobile device. In alternative embodiments, the image capture process can be initiated from apparatus 150 instead, such as by the user pressing a button on apparatus 150, or other suitable user input. Responsive to sensing such a user input event, controller 151 of apparatus 150 sends an indication via link 135 to device 110. Responsive to said indication, an application running on device 110, such as application 116, will then initiate a burst image capture procedure, such as described above. Operation can then proceed as described above.

Preferably, apparatus 150 is configured or can be configured to operate with a wide variety of cameras and mobile devices 110 having a wide range of characteristics. In exemplary embodiments, the operation of apparatus 150, including, for example the mode of operation and/or the timing of one or more of the above-described events can be varied in accordance with a make or model of the mobile device 110. Such information can be obtained by application 116 (e.g., automatically or by user input) and can be used by the application to configure apparatus 150 via link 135. Application 116 may also provide a user interface allowing for manual adjustment of one or more parameters. Alternatively or in addition, apparatus 150 may have a user or communication interface allowing configuration of apparatus 150 without the involvement of mobile device 110.

In the exemplary operation depicted in FIG. 3, burst 305 is shown as involving two images, image 310, which is discarded, and image 320 which is retained. It should be noted, however, that one or more images after image 320 can also be captured using the same arrangement. In such a scenario, after image 320 has been captured and shutter 152 closed, application 116 will cause an additional indication to be conveyed via link 135 to apparatus 150, similar to that sent represented by event 313 following the capture of image 310. Operation then proceeds as described above, and repeats for any additional images in burst 305.

Figure 4:
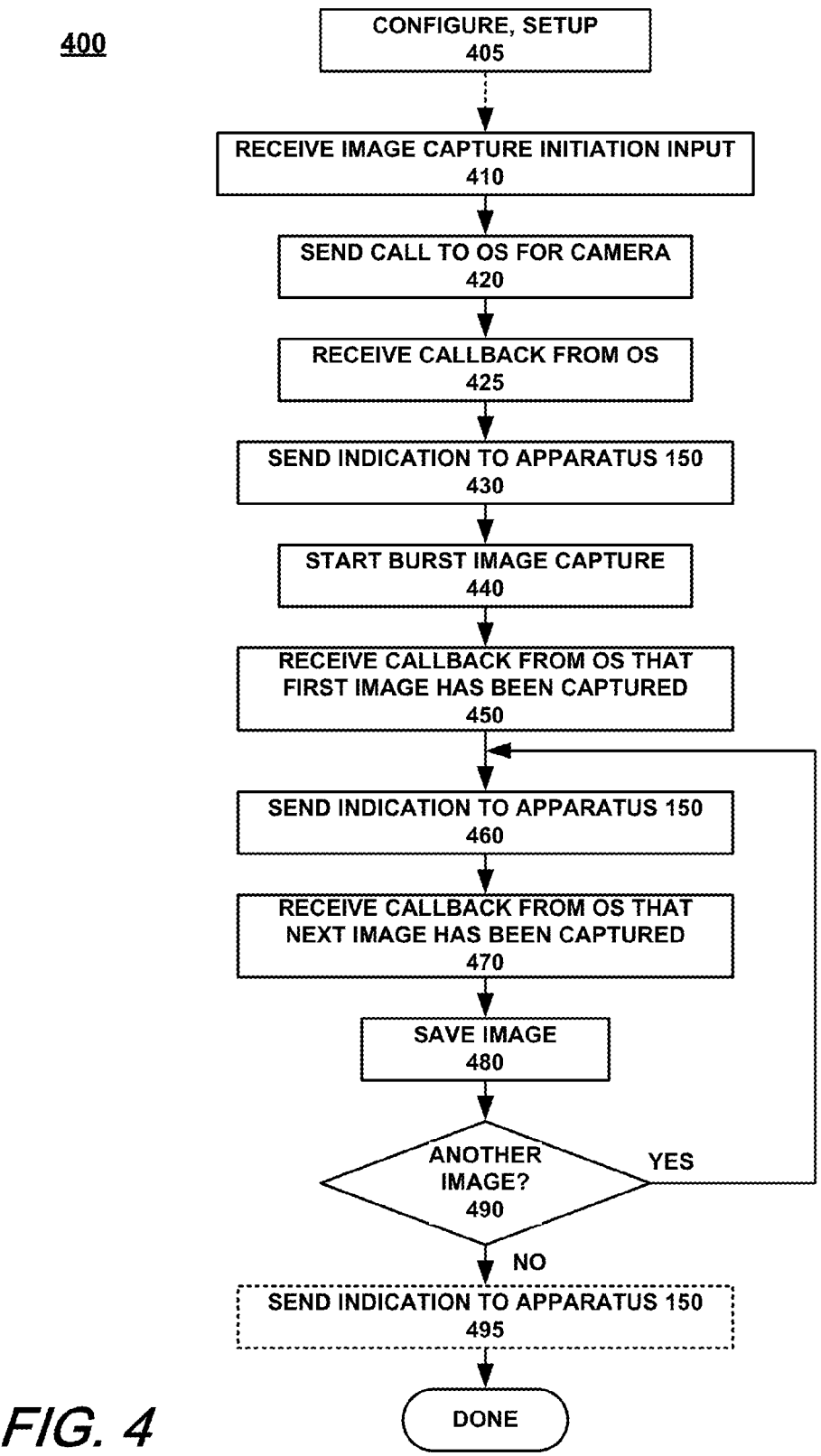
FIG. 4 is a flowchart depicting an exemplary image capture process carried out on a mobile device in accordance with the present disclosure.

FIG. 4 is a flowchart depicting an exemplary image capture process 400, such as would be carried out by the execution of application 116 on mobile device 110. As shown, operation begins at 405 with the configuration of the mobile device 110 and/or apparatus 150. As described above, mobile device camera 114 is configured for a burst mode of operation, a long exposure time (e.g., $\frac{1}{10}$s), and preferably with any integrated light source disabled.

At some later point 410, an indication is received that an image capture procedure is to be initiated. As discussed above, such an indication can be generated by a user pressing an image capture button on mobile device 110 or on apparatus 150. Responsive thereto, a call is sent at 420 to the mobile device operating system 115 to operate camera 114 in accordance with the configuration implemented at 405. At 425, a callback is received from operating system 115 once the camera is ready. At 430, an indication is sent to apparatus 150 so that it will close shutter 152. At 440, a call is sent to operating system 115 for the camera to begin the image capture procedure. As discussed above with reference to FIG. 3, the order of events represented by 430 and 440 may be reversed.

At 450, once the first image of the image capture burst has been captured, a callback is received from the operating system indicating same. Responsive thereto, an indication is sent at 460 to apparatus 150 via link 135. In response to said indication, apparatus 150 operates shutter 152 and flash 153 during the capture of the second image of the image capture burst, as described above and depicted in FIG. 3.

At 470, once the second image of the image capture burst has been captured, a callback is received from the operating system indicating same. At 480, the second image is saved for further processing, display and/or communication. If camera 114 has been configured for a burst of more than two images, as determined at 490, operation loops back to 460 to send another indication to apparatus 150 to operate its shutter and flash for the capture of an additional image. Operation then proceeds as described above until it is determined at 490 that there are no more images to be captured. If so, at 495 a further indication may optionally be sent to apparatus 150 indicating that the capture procedure has been completed. Apparatus 150 can then re-open shutter 152, as shown in FIG. 3.

In the embodiments described above, shutter 152 is closed at or about the beginning of the image capture burst 305. It is contemplated that the response of shutter 152 to control signals from controller 151 will experience some lag, particularly if it is an electromechanical shutter. As such, closing shutter 152 at or about the beginning of the image capture burst 305, ensures that it is fully closed and stable before it is signalled to open again. This results in a more repeatable and predictable timing when signaled to open. For implementations of shutter 152 where such considerations are not a concern (e.g., a LCD shutter), it may be possible to dispense with the initial closing at or about the beginning of the image capture burst 305, and keep shutter 152 open until it is time to close it during readout 320.3 of the second image. This is represented in phantom in FIG. 3. Shutter 152 can then be re-opened, as described above, and kept open until the readout phase of the next image to be captured.

In the embodiments described so far, a burst mode of operation with at least two images is employed. In this case, it is contemplated that it is not possible to determine with sufficient precision when an image is actually captured by camera 114 after application 116 has instructed operating system 115 to cause the camera to initiate image capture. It is also contemplated, however, that the timing of the capture of each of the second and subsequent images of a multi-image burst, can be reliably predicted with sufficient precision based on the callback from operating system 115 indicating that the preceding image has been captured. As can be appreciated, in the case of a mobile device in which the timing of the capture of a single image can be predicted with sufficient precision, a single image capture mode can be employed, with the single image being retained. It may also be possible to use a single image capture mode with a mobile device that provides additional information to application 116 regarding the timing of the image capture events of the camera, such as, for example, an operating system callback that indicates with sufficient precision the start of the capture of a single image.

The foregoing merely illustrates principles of the invention and it will thus be appreciated that those skilled in the art will be able to devise numerous alternative arrangements which, although not explicitly described herein, embody the principles of the invention and are within its spirit and scope. For example, although illustrated as single elements, each such block or step shown may be implemented with multiple blocks or steps, or various combinations thereof. Also terms such as "software," "application," "program," "firmware," or the like, are intended to refer, without limitation, to any instruction or set of instructions, structure, or logic embodied in any suitable machine-readable medium. Additionally, the "operating system" of a device is intended to refer to any software or the like involved in the management of hardware and/or other software on the device. In addition, the term "call" or the like is intended to refer to any suitable indication, signal, message, request, command, direction, or the like, that may be communicated between software and/or hardware elements. The term "callback" or the like is intended to refer to a response to or acknowledgement of a call. The term "indication" is intended to refer to a message, command, request, flag, signal, or the like, encoded or otherwise. It is to be understood that numerous modifications may be made to the illustrative embodiments and that other arrangements may be devised without departing from the spirit and scope of the present invention as defined by the appended claims.

What is claimed is:

1. A method of exposing, with an image exposure apparatus, an image to be captured with a device having a camera integrated therewith, the image exposure apparatus being external to the device and including a light emitter and a global shutter, the method comprising:
   initiating an image capture procedure to be performed by the device, the image capture procedure having an exposure phase and a readout phase after the exposure phase;
   receiving, at the image exposure apparatus, an indication from the device;
   activating the light emitter after receiving the indication and before the end of the exposure phase;
   de-activating the light emitter; and
   closing the global shutter before the readout phase.

2. The method of claim 1, wherein the camera has a rolling shutter.

3. The method of claim 1, wherein the light emitter is de-activated before closing the global shutter.

4. The method of claim 1, wherein the image capture procedure is a burst image capture procedure with at least two images, and the global shutter is closed before the readout phase of the second image.

5. The method of claim 4, wherein the indication is received before the exposure phase of the second image.

6. The method of claim 1, comprising:
   closing the global shutter after initiating the image capture procedure; and
   opening the global shutter after receiving the indication from the device and before the end of the exposure phase.

7. The method of claim 1, comprising:
   opening the global shutter after the readout phase.

8. The method of claim 1, wherein the image capture procedure is initiated responsive to a user input at the device.

9. The method of claim 1, comprising receiving, at the image exposure apparatus, configuration information from the device.

10. The method of claim 1, wherein the light emitter includes a xenon flash.

11. Apparatus for use with a device having a camera integrated therewith, the apparatus being external to the device and comprising:
   a global shutter for selectively shuttering the view of the camera;
   a light emitter for illuminating the view of the camera; and
   a controller, wherein the controller is configured to control the global shutter and the light emitter in accordance with an indication from the device.

12. The apparatus of claim 11, wherein the controller is configured to control the global shutter to be open during an exposure phase of an image capture procedure and closed during a readout phase after the exposure phase of the image capture procedure, and wherein the controller is configured to control the light emitter to be on during the exposure phase.

13. The apparatus of claim 11, wherein the camera has a rolling shutter.

14. The apparatus of claim 11, wherein the light emitter includes a xenon flash.

15. The apparatus of claim 11 comprising an optical element through which light shuttered by the global shutter passes, the optical element including at least one of a filter, a polarizer, and a cover glass.

16. The apparatus of claim 11 comprising an optical element through which light emitted from the light emitter passes, the optical element including at least one of a filter, a polarizer, and a cover glass.

17. The apparatus of claim 11, wherein the global shutter is a liquid crystal display (LCD) shutter.

18. The apparatus of claim 11 comprising means for mating the apparatus to the device.

19. The apparatus of claim 11, wherein the controller is configured to receive a user input for initiating an image capture procedure and in response send an indication to the device.

20. The method of claim 1, wherein the image capture procedure is initiated responsive to a user input at the image exposure apparatus, the method comprising sending an image capture initiation indication from the image exposure apparatus to the device.

21. The apparatus of claim 11, wherein the global shutter is a mechanical shutter.

* * * * *